United States Patent [19]
Flotow et al.

[11] 4,383,352
[45] May 17, 1983

[54] METHOD OF MAKING SPRING CLUTCH COLLECTOR RING

[75] Inventors: Richard A. Flotow, Fort Wayne; Lawrence C. Lantz, Garrett, both of Ind.

[73] Assignee: Dana Corporation, Toledo, Ohio

[21] Appl. No.: 312,216

[22] Filed: Oct. 19, 1981

[51] Int. Cl.$^3$ ............................................. B23D 17/00
[52] U.S. Cl. ...................................... 29/418; 72/342; 29/413; 29/414; 413/12
[58] Field of Search ...................... 148/127, 16.5, 311; 225/93.5; 29/418, 173, 414, 413; 72/342, 325, 324, 377, 379; 413/12, 67

[56] References Cited

U.S. PATENT DOCUMENTS

| | | | |
|---|---|---|---|
| 1,426,275 | 8/1922 | Campbell | 29/418 |
| 2,960,764 | 11/1960 | Reichl | 29/418 |
| 3,404,801 | 10/1968 | Silver | 413/12 |
| 3,668,917 | 6/1972 | Komatsu et al. | 72/342 |
| 3,753,798 | 8/1973 | Komatsu et al. | 148/131 |
| 3,964,737 | 6/1976 | Schober | 267/161 |
| 4,030,433 | 6/1977 | Bly | 413/12 |
| 4,039,354 | 8/1977 | Schober | 148/16.5 |
| 4,135,283 | 1/1979 | Kohlhage | 29/173 |
| 4,255,216 | 3/1981 | Conant et al. | 225/93.5 |

FOREIGN PATENT DOCUMENTS 330840  6/1930  United Kingdom .................. 29/418

Primary Examiner—Ervin M. Combs
Assistant Examiner—Steven E. Nichols
Attorney, Agent, or Firm—Frank B. McDonald

[57] ABSTRACT

An improved method of making a collector ring enhances the cyclic engagement and disengagement of a spring clutch of the type having an annular spring compressed between a clutch cover and plurality of externally located release levers. The preferred method is applicable to a collector ring which defines a radially extending annular base member having an integral axially extending rim on its outer perimeter. The rim abuts and encircles the outer circumference of the annular spring, while the base member is positioned interjacent the spring and levers for transfering reaction loads therebetween. A preferred method of making the ring comprises the steps of (a) forming a body defined by a radially extending planar portion having an integral, axially extending, circular perimeter; (b) forming an annular reduced shear portion on the body radially inwardly of the latter perimeter to define an outer annular ring thereon, wherein the ring is integrally joined to the body at the reduced shear portion, (c) heat treating the body, and (d) detaching the outer ring from the body at the reduced annulus. The detached ring defines the improved collector ring.

11 Claims, 4 Drawing Figures

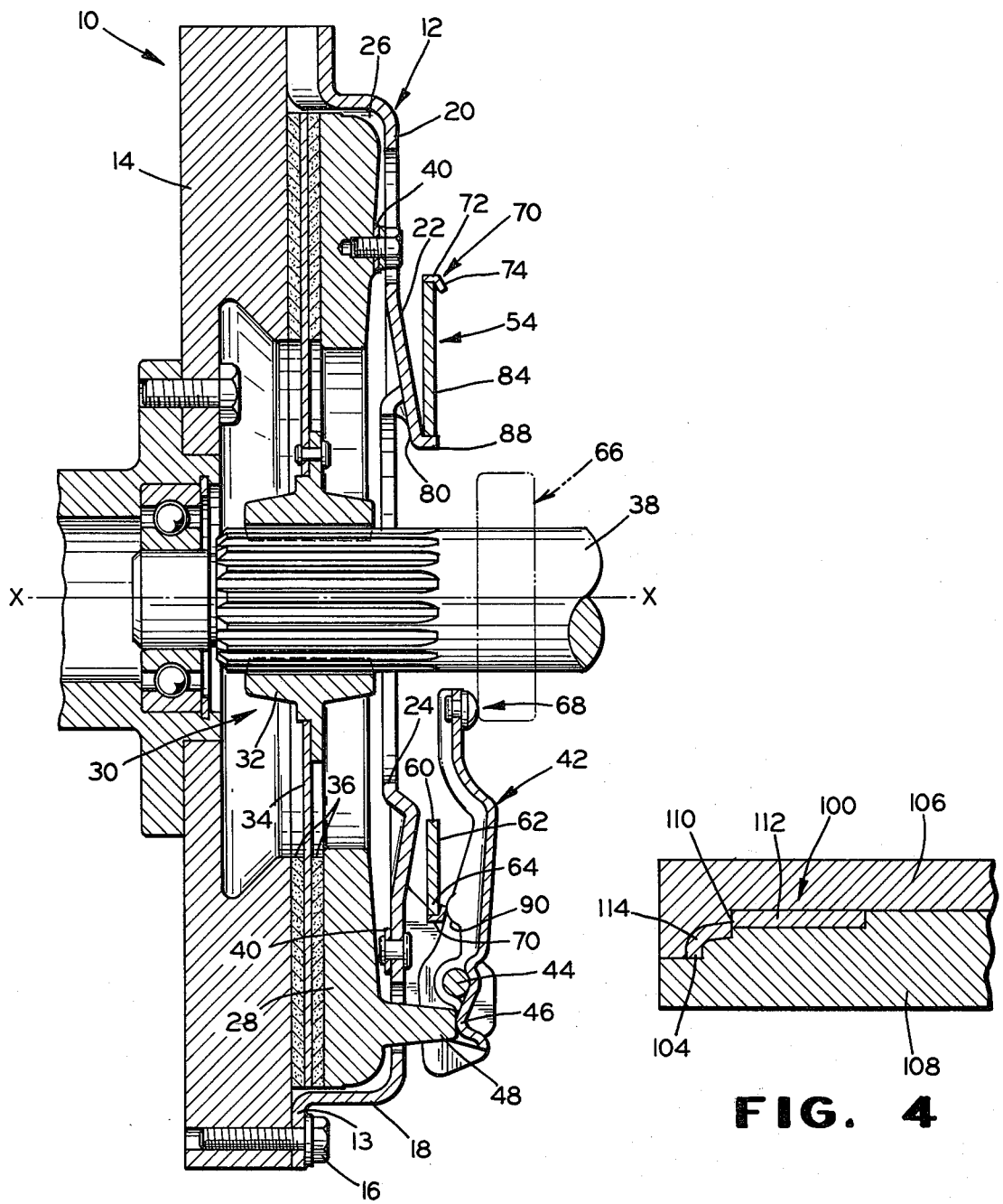
FIG. 2
FIG. 4
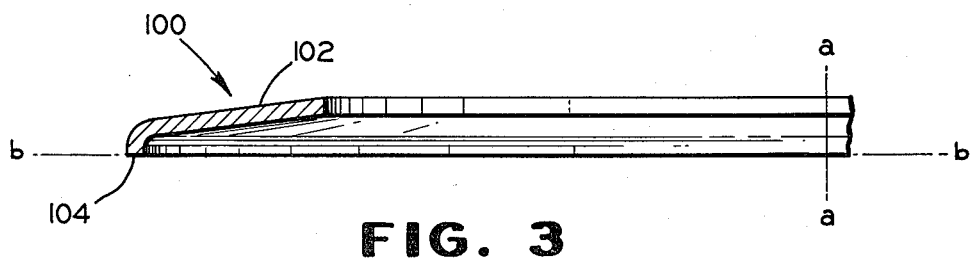
FIG. 3

METHOD OF MAKING SPRING CLUTCH COLLECTOR RING

BACKGROUND OF THE INVENTION

This invention relates to clutches of the type employing an annular or Belleville spring for actuating heavy duty clutches. More particularly, the invention concerns an improved method of manufacturing a collector ring for use with the latter spring, wherein elimination of warpage of the ring is achieved. Such warpage and consequent unevenness of surface is otherwise introduced into the ring during the heat treatment and/or quenching phases of its manufacture. The lack of successful control of hoop stresses imposed during the heating and cooling of relatively thin annular members generally results in the loss of planar quality, wherein portions of such members are not contained within a common plane.

Several attempts have been made to reduce the extent of the problem as related to the manufacture of collector rings; one of such attempts being the heating of stacks of such rings, each loaded against the next, during heating and quenching operations. A principal drawback, however, is that surface hardness is not optimized thereby during the tempering of such rings, as the heating and cooling processes are not uniformly conducted therethrough.

Ideally, each hoop member could be suspended separately, and thus heat treated in a free and unrestrained state without warpage and unevenness of surface; thus maintaining its planar quality as well as having the requisite or desired hardness.

SUMMARY OF THE INVENTION

This invention provides a means by which collector rings for Belleville clutches may be individually suspended during the heat treatment and quenching phases of their mass manufacture, without resultant warpage or unevenness of their surfaces. Moreover, the overall surface hardness of the rings is rendered uniform and hence satisfactory without a need for compromise in planar quality.

A preferred method of making the collector ring of this invention incorporates the steps of first forming a radially extending annular frustoconical metal body having an axially extending circular perimeter. A reduced shear annulus is stamped radially inwardly of the axially extending perimeter of the body to define inner and outer rings, the outer ring thus containing the aforementioned axially extending perimeter. The body is then heat treated and quenched, wherein the reduced shear annulus is through-hardened while the remainder of the body is case hardened. Through-hardening of the reduced shear annulus results in brittleness thereof, wherein the outer ring may then be easily detached from the inner ring at the reduced shear annulus. The detached outer ring then defines a heat treated, uniformly surface hardened collector ring.

BRIEF DESCRIPTION OF THE DRAWINGS

FIG. 2 is a cross sectional view along lines 2—2 of FIG. 1;

FIG. 3 is a partial cross-section of a frustoconical metal body having an axially extending circular perimeter thereabout in accordance with a preferred method as described herein; and FIG. 4 is a partial cross section of the metal body of FIG. 3 during the step of forming an annular reduced shear annulus therein in accordance with a preferred method as described herein.

DETAILED DESCRIPTION OF PREFERRED METHOD

Figure 1:
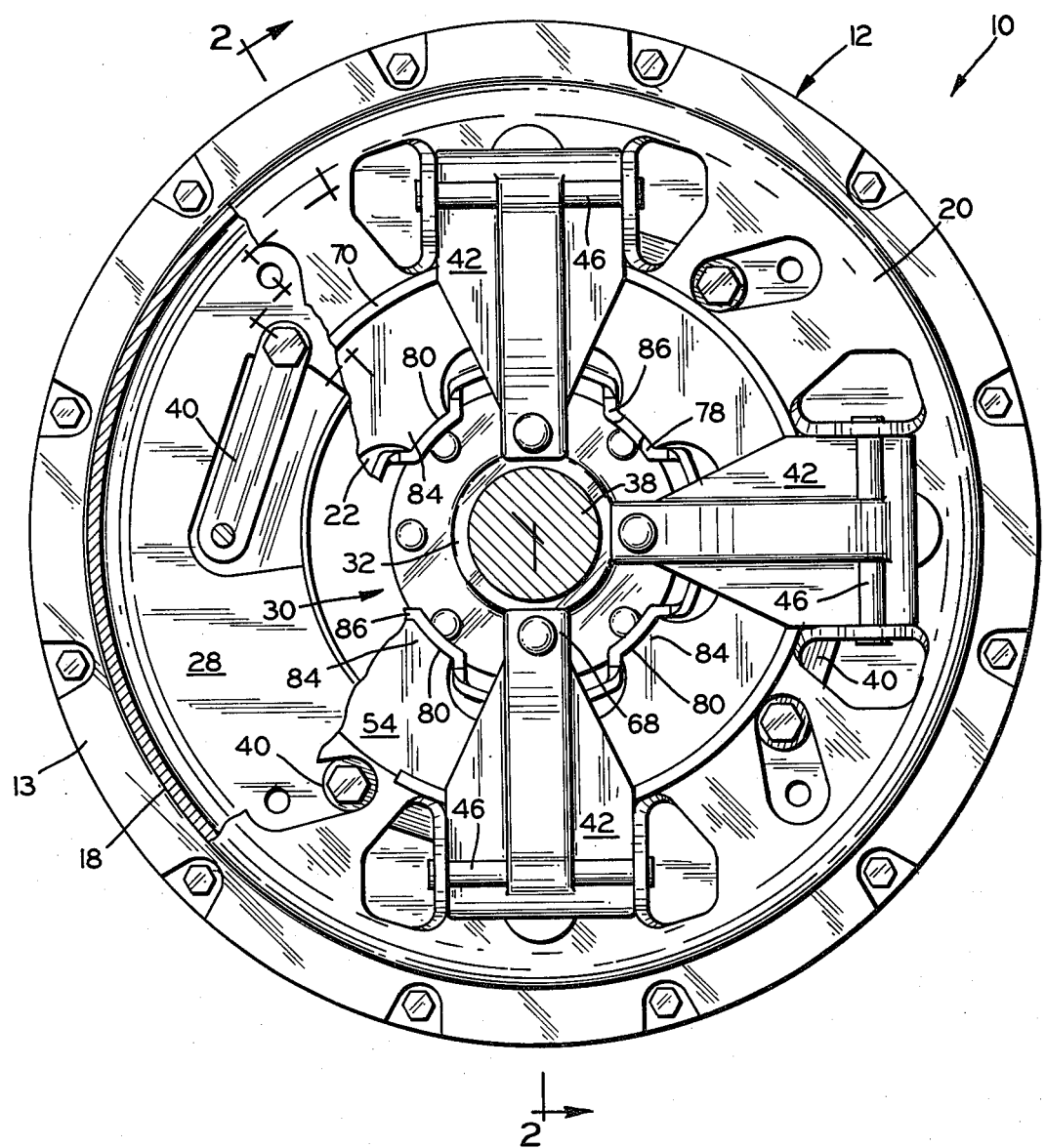
FIG. 1 is a rear elevational view of a clutch incorporating the collector ring of the subject invention, with parts broken away to more clearly depict features thereof.

Referring to FIGS. 1 and 2 of the drawings, a collector ring 70 and its preferred method of manufacture are herein described for a friction clutch of the Belleville spring type shown generally at 10.

Having a central axis X—X, the clutch 10 includes an annular cover 12, having a peripheral flange portion 13. The latter portion 13 is secured to the rear face of a standard flywheel 14 by a plurality of circumferentially spaced bolts 16, so that the cover 12 rotates with the flywheel 14. The cover 12 further comprises a rim portion 18 extending in a generally axial direction, and an end wall 20 extending radially inwardly from the rim portion 18 and terminating in an angularly disposed ramp 22. The radially inner portion of ramp 22 defines a central opening 24 in the end wall 20 of the cover 12.

An annular space 26 is provided between the flywheel 14 and the cover 12 for receiving a pressure plate 28. A driven disc 30 is adapted to be clamped between the pressure plate 28 and the flywheel 14.

The driven disc 30 comprises a central hub 32 having a support plate 34 secured thereto with friction facings 36 fastened on opposite sides of the support plate 34. The central hub 32 is splined to the outer end of a transmission input shaft 38 with the friction facings 36 positioned between the pressure plate 28 and flywheel 14. The splined connection permits the driven disc 30 to move freely in an axial direction relative to the input shaft 38 while being rotatable with it.

The pressure plate 28 is axially movable into engagement with driven disc 30 to clamp the same against the flywheel 14 for drivingly connecting the rotatable drive and driven members of the clutch. A plurality of circumferentially spaced drive straps 40 rotatably connect the pressure plate 28 to the cover 12 and permit limited axial movement of the pressure plate 28 relative to the cover 12. The straps 40 further serve as a means to lift the pressure plate 28 away from the flywheel when the clutch 10 is actuated to its disengaged position. The opposite ends of the drive straps 40 are connected to both the cover 12 and the pressure plate 28 in a conventional manner.

A lever operating mechanism is provided to move the pressure plate 28 axially relative to the cover 12 and into and out of engagement with the driven disc 30. The lever operating mechanism is disposed wholly outside of the cover 12, and comprises a plurality of radially extending levers 42 pivotally connected to the cover 12 by pivot pins 44. Outer or tail ends 46 of each lever 42 engage integral bosses 48 formed on the pressure plate 28.

Resilient means 54 are provided to apply an axially engaging force to the pressure plate 28 to normally urge the same into clamping engagement with the driven disc 30. The resilient means is preferably designed to maintain a substantially constant pressure regardless of wear on the driven disc friction facing 36. In a preferred embodiment, the resilient means 54 is an annular Belleville spring 54, compressed between the cover 12 and the levers 42. The Belleville spring 54 in its unstressed state is frustoconical in shape, having an inner peripheral portion 60, an intermediate cone-shaped portion 62, and an outer peripheral portion 64. Inner and outer peripheral portions 60 and 64 are axially spaced and approach the same plane as the spring 54 is placed under compression, the spring being designed to have a fixed inner peripheral portion 60 react against the cover 12, and a moveable outer peripheral portion 64 engage and be movable with the levers 42. Because of the spring movement, the cover ramp 22 is angled to permit clearance during operation.

The levers 42 are arranged to be depressed against the action of the spring 54 by a throw-out bearing 66 operating against inner or nose ends 68 of the levers 42. Operation of the throw-out bearing 66 causes the lever 42 to pivot about the pins 44. The outer ends 46 respond by moving the pressure plate 28 clampingly against the driven disc 30 to force same against the flywheel 14.

To equally distribute load from the spring to the levers 42, an annular collector ring 70 is provided. The collector ring 70 is L-shaped in cross-section, and comprises an annular, axially extending rim 72 which encircles the outer peripheral portion 64 of spring 54, and has a radially inwardly extending annular base 74. The base 74 is adapted to be positioned between the back face of spring 54, and adjacent the front face of the levers 42. Thus, the base 74 is disposed for transferring the reaction load of the spring 54 to the levers 42, and is disposed at a slight angle to provide clearance for the outer peripheral portion 64 when the levers 42 are pivoted to their clutch disengaged position. The collector ring 70 has sufficient clearance with respect to the outer peripheral portion 64 to permit it to move freely during the various clutch operating stages. In order to insure free unimpaired movement of the outer peripheral portion 64, the base 74 is angled outwardly toward the throwout bearing 66 a slight amount, as shown. The levers 42 are in constant contact with the collector ring base 74, and they serve to hold the collector ring 70 in place against the spring 54. The annular collector ring 70 results in an even, hence equal, distribution of the engaging load against the levers 42. Without the collector ring 70, the spring 54 will bear directly against the levers, resulting in repeated cyclic distortion of the spring 54, and eventual permanent damage thereto.

The outer peripheral portion 64 of the spring 54 is encircled by the collector ring 70 as described. The inner peripheral portion 60 contains a plurality of inwardly extending tongues 84. The tongues 84 are uniformly spaced apart, each tongue 84 extending into a corresponding recess 80 in the cover 12, which in turn extends inwardly from the ramp 22. Each recess 80 contains side walls 86, and a lip 88 for a secure non-slipping engagement of the inner peripheral portion 60 of the spring 54 and the cover 12.

The operation of the clutch described is that of a conventional "push-type" clutch. Thus, in the normally engaged position of the clutch, the tongues 84 of the Belleville 54 will react in the recesses 80 of the cover 12. The outer periphery 64 of the Belleville 54 will urge the collector ring 70 axially outwardly against intermediate noses 90 of the levers 42. The levers 42 will then pivot about pins 44 and the lever outer ends 46 will exert an axially inward force against the pressure plate 28 through the pressure plate bosses 48.

To disengage the clutch, an operator will typically depress a clutch pedal with his left foot. This action will cause the throwout bearing 66 to move axially inwardly against the inner ends or noses 68 of the levers 42. The intermediate noses 90 will then urge the collector ring 70 axially inwardly, thus collapsing the Belleville and causing inner and outer peripheral portions 60 and 64 thereof to lie in a common plane. The levers 42 will pivot about pins 44, and the outer ends 46 thereof will release the axial pressure previously held against the pressure plate bosses 48.

It may now be appreciated that a warped or otherwise non-planar collector ring 70 will contribute to an unevenly distributed loading and unloading of the clutch 10, and will result in an accelerated wear of the clutch throwout bearing, as well as impairment of an otherwise smooth engagement and disengagement of the clutch.

A preferred method of insuring planar manufacture of ring 70 of this invention is now described in reference to FIGS. 3 and 4. In FIG. 3 is shown a partial sectioned view of an annular metal body 100, having an axis a—a, and preferably comprising both a generally radially extending frustoconical shaped portion 102 and an integral axially extending circular perimeter portion 104 thereabout. The frustoconical portion 102 is shown in its unrestrained form, and is preferably of a cross section having an angular deflection in the range of 5 to 10 degrees from line b—b, which passes through a radially extending phase therethrough (not shown). The latter angle will insure that the base 74 of the resultant collector ring 70 is greater than 90 degrees from the rim 72, thus providing clearance for movement of the outer peripheral portion 64 of the Belleville 54 as earlier noted.

In FIG. 4, the body 100 is shown in a mating set of upper and lower progressive stamping dies, 106 and 108, wherein a reduced shear annulus 110 is formed into the body, radially inwardly of its perimeter portion 104. This operation thus produces inner and outer rings 112 and 114 integrally joined by the reduced shear annulus 110. The thickness of the reduced shear area is preferably such that the annulus 110 will become throughhardened, hence brittle, via a normal heat treatment step, as will be appreciated by those skilled in the art. Thus, for example, in a steel sheet body of one hundred thousandths of an inch original material thickness, and assuming desired case hardness depth to be approximately ten thousandths, the thickness reduction would preferably be on the order of about 80 percent, or down to 20 thousandths thus 20 percent of original thickness. Skin penetration of ten thousandths on both sides of the body would provide full penetration, hence throughhardness of the 20 thousandths inch thick reduced shear annulus.

The heat treatment step, in a preferred practice, consists of heating the sheet metal body in a carbonitride gaseous atmosphere to a temperature within a range of 1425° F. to 1700° F. for a time ranging from 30 minutes to 2 hours, in an inverse relationship. Thus, the lower the temperature, the longer the duration and vice versa. As an example, a satisfactory combination of temperature and time is established at 1600° and 1 hour and 15 minutes, respectively.

After heat treatment, the body is preferably quenched in oil for 3 to 10 minutes at 130° F. to 150° F., for example for five minutes at 130°. Alternatively, the body may be quenched in other quenching media as, for example, air or water, but in any event, a preferred surface hardness of approximately 65 Rockwell, (C-scale) is desirable. After quenching, the outer ring 114 is easily separated by tapping with a rubber mallet along the embrittled reduced shear annulus 110. The resultant detached outer ring 114 then defines an improved collector ring 70 which is free from warpage, the thermal strains imposed thereon during heat treatment having been absorbed in major part by the inner ring 112. In practice of the preferred method, the relative ratio of outer-to-inner ring surface area is within the range of five to twenty percent.

What is claimed is:

1. A method of making a collector ring for a Belleville clutch spring comprising the steps of:
    (a) providing a body having a circular perimeter;
    (b) forming a reduced shear annulus in said body radially inwardly of said perimeter to define an outer ring about said reduced shear annulus and an inner body portion radially inwardly of said reduced shear annulus, said ring being integrally joined to said inner body portion via said reduced shear portion,
    (c) heat treating said body, and
    (d) detaching said outer ring from said inner body portion along said reduced shear annulus, whereby said detached outer ring comprises said collector ring.

2. The method of claim 1 wherein said body further defines a radially extending annulus having an integral, axially extending flange.

3. The method of claim 2 wherein said inner body portion comprises an inner ring concentric with said outer ring, said inner ring disposed for absorbing thermal stresses imposed on said body.

4. The method of claim 3 wherein said reduced shear annulus is rendered brittle by said heat treating step.

5. The method of claim 4 wherein said outer ring is case-hardened by said heat treating step, and said reduced shear annulus is through hardened by said heat treating step.

6. The method of claim 5 wherein said body comprises a metallic material.

7. The method of claim 6 further comprising the step of quenching said body after said heat treating step and prior to separation of said outer ring therefrom.

8. The method of claim 7 wherein said forming step is effected by stamping.

9. The method of claim 8 wherein said radially extending annulus of said body is frustoconical.

10. The method of claim 9 wherein said radially extending annulus in an unrestrained state comprises a cross-section defining an angular deflection in the range of 5 to 10 degrees from a radially extending plane therethrough.

11. The method of claim 10 wherein said body is heat treated in an unrestrained state.